July 18, 1967

E. KOST ETAL 3,331,238

SEALING AND CLAMPING HEAD FOR AN END OF
A TUBE TO BE PRESSURE-TESTED

Filed Jan. 14, 1965

INVENTORS
Erwin Kost and
Ali Bindernagel

Their Attorneys

United States Patent Office 3,331,238
Patented July 18, 1967

3,331,238
SEALING AND CLAMPING HEAD FOR AN END OF A TUBE TO BE PRESSURE-TESTED
Erwin Kost, Dusseldorf-Oberkassel and Ali Bindernagel, Dusseldorf-Gerresheim, Germany, assignors to Kommanditgesellschaft Friedrich Kocks, Dusseldorf, Germany, a corporation of Germany
Filed Jan. 14, 1965, Ser. No. 425,531
Claims priority, application Germany, Feb. 29, 1964, K 52,255
10 Claims. (Cl. 73—49.5)

ABSTRACT OF THE DISCLOSURE

A sealing and clamping head for an end of a tube to be pressure-tested comprising a housing having an opening for receiving an end of a tube, the housing containing sealing and clamping means disposed about such opening so as to be adapted to seal and clamp the tube, means for admitting testing fluid under pressure from a source of such fluid into the housing to enter the end of a tube therein and separate connections between the sealing and clamping means and the source of fluid under pressure for rendering the sealing and clamping means operative to seal and clamp the tube simultaneously with admission of fluid under pressure into the tube so that the sealing and clamping pressure on the outside of the tube is equal to the testing pressure inside the tube, obviating deformation of the tube in the sealing and clamping zone by unequal internal and external pressures. Preferably the sealing and clamping means are both rendered operative by radial pressure. The clamping means may comprise a metallic sleeve having slots extending parallel to the axis of the sleeve from the ends of the sleeve with slots extending from the respective ends of the sleeve alternating with each other in the circumferential direction. Resilient packing may surround the sleeve. The housing may have an opening at one end for receiving the end of the tube and an opening at the opposite end for receiving the fluid under pressure. The sealing means may have a helical spring embedded therein at the portion thereof engaging the tube.

---

Figure 1:
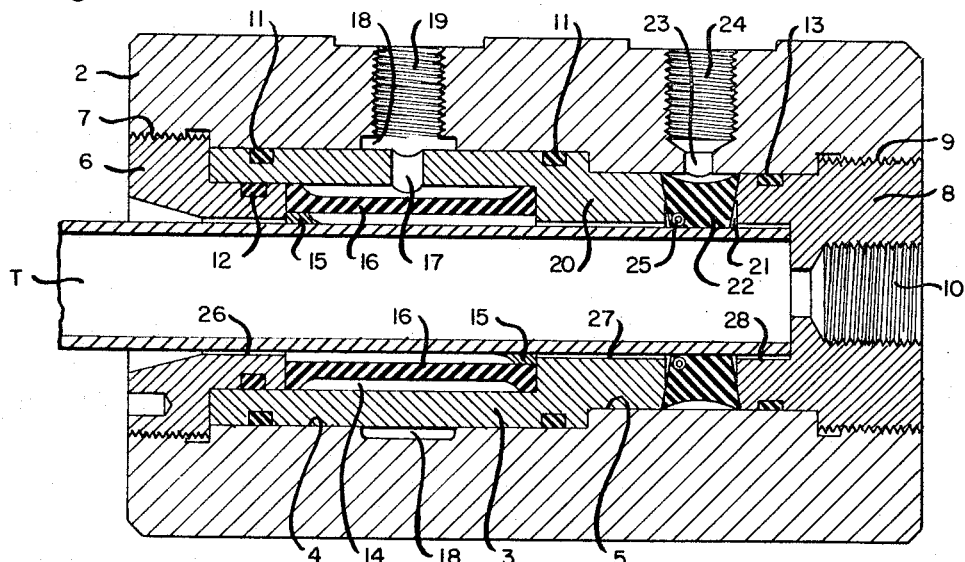

This invention relates to a sealing and clamping head for an end of a tube to be pressure-tested and particularly to such a head obviating damage to and distortion of the tube when clamped in the head.

Apparatus for testing tubes or pipes by means of fluid under pressure admitted to the interior of the tube or pipe being tested is known in which at least one end of the tube is tightly sealed by mounting a sealing head thereon through which the testing fluid is delivered into the interior of the tube while the other end of the tube, which is also tightly sealed against the pressure of the testing fluid, is held, for example, by a force-absorbing support braced to the sealing head. In such apparatus the tube wall is subject to circumferential or tangential stress and against axial compression during testing.

Another type of apparatus for pressure-testing tubes, to which the present invention relates, subjects the tube wall to axial stress in addition to tangential stress; the heads not only seal but also clamp the ends of the tube, the clamping preventing longitudinal contraction of the tube during testing. The known sealing and clamping heads employed in this type of apparatus include an annular seal of elastic material applied to the tube at or adjacent its end by axial or radial pressure applied by the testing fluid and clamping jaws which may be applied in various ways. The clamping jaws are of metal and when applied may cause damage to or distortion of the tube. The extent of damage or distortion increases with decreasing wall thickness of the tube. There is no assurance that the pressure exerted by the clamping jaws upon the outside of the tube will not substantially exceed the internal testing pressure, resulting in indenting the outer surface of the tube.

Our sealing and clamping head has, in accordance with our invention, the sealing means and the clamping means subject to load, preferably independently of each other, the load resulting from the pressure of the testing fluid, so that the pressure of the clamping means upon the outside of the tube is always equal and opposed to the pressure of the testing fluid within the tube, thus effectively avoiding distortion of even thin-walled tubes. Our clamping means withdraws automatically from the wall of the tube upon decrease of the testing pressure so that the tube which has been tested may easily be withdrawn from the head and another tube inserted.

The clamping means preferably comprise two parts, a metallic sleeve and resilient packing, preferably in the form of an annulus, disposed about the sleeve. The metallic sleeve is constructed and arranged so that when not radially compressed it is slightly spaced from the tube and when radially compressed against the tube it will grip the tube. It may be provided with slots extending parallel to the axis of the sleeve from the ends thereof with slots extending from the respective ends of the sleeve staggered or alternating with each other in the circumferential direction so that the sleeve is resilient whereby it can be radially compressed and when released will spring back to its initial form.

The housing is preferably provided with an annular recess into which the sleeve and packing are inserted, the recess being open at the end of the housing which receives the end of the tube to be tested, the sleeve and packing seating against the inner end of the recess and being surrounded by an annular space connected with the source of fluid under pressure. The outer end of the recess is constituted by a plug as will be illustrated.

The testing fluid under pressure acting upon the outer surface of the resilient packing presses the packing against the inner and outer ends of the annular recess in which the clamping means are disposed and also presses the packing against the metallic sleeve causing the sleeve to grip the tube uniformly and firmly thereabout, thus clamping the tube to the head. When the testing pressure drops the packing and sleeve return to their initial form and position due to their elasticity thus automatically releasing the tube and permitting its withdrawal from the head.

The packing is preferably in the form of an annulus having lip-shaped flanges at its ends. The annulus is also preferably provided with inwardly tapering end faces to avoid axial upsetting.

The wall thickness of the clamping sleeve is greater than the greatest clearance between the outer surface of the tube and the bore in the head through which the tube extends. Considering that the common diameter tolerance of tubes is ±1%, said bore may be of greater diameter than the external diameter of the tube by 1%. The same clearance may exist between the seal and the tube when the seal is not under pressure. If danger is deemed to exist that at high test pressure the seal might be pushed into the clearance where it might jam or become damaged a metallic helical spring may be embedded in the seal at the portion thereof engaging the tube. Such spring effectively supports the seal against the testing pressure.

Other details, objects and advantages of the invention will become apparent as the following description of certain present preferred embodiments thereof proceeds.

Figure 2:
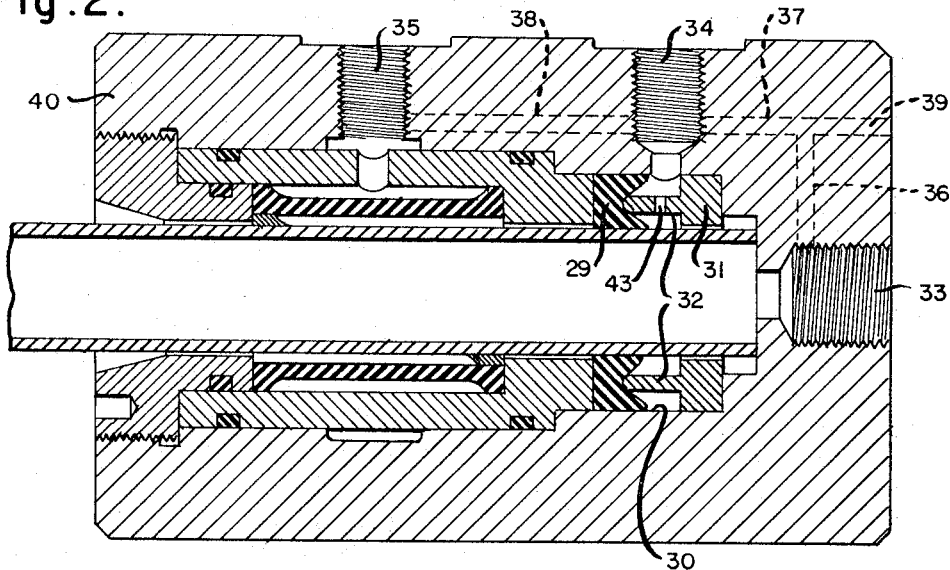
Figure 3:
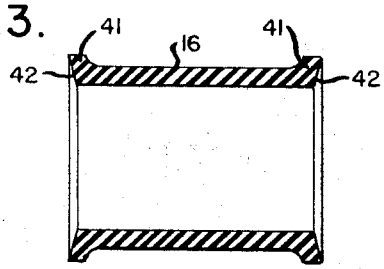

In the accompanying drawings I have shown certain present preferred embodiments of the invention in which FIGURE 1 is a longitudinal section through a sealing and clamping head for an end of the tube to be pressure-tested, which head incorporates a seal disposed in a radial groove;

FIGURE 2 is a view similar to FIGURE 1 of a modified construction in which the seal is disposed in an axial groove; and FIGURE 3 is a longitudinal section through the packing which is disposed about the clamping sleeve.

Referring now more particularly to the drawings and first to FIGURE 1, the housing of our sealing and clamping head is designated generally by reference numeral 2 and has disposed therein an insert 3 which is introduced into the housing 2 from the left hand end of the housing and disposed in the central bore 4 thereof. The right hand end of the insert 3 viewing FIGURE 1 is disposed in a reduced bore 5 of the housing. The insert 3 is maintained in place in the housing 2 by a plug 6 screwed into an enlarged portion 7 at the end of the sleeve bore. At the opposite end of the sleeve a plug 8 is screwed into an enlarged bore 9 communicating with the bore 5. The plug 8 is provided with a bore 10 through which the testing fluid under pressure is admitted to the interior of the tube to be tested.

The insert 3 is sealed to the housing 2 by sealing rings 11 and to the plug 6 by a sealing ring 12. A sealing ring 13 seals the plug 8 to the housing. The parts are shaped to provide about a portion of the tube end T received in the head an annular recess 14 in which are disposed a metallic clamping sleeve 15 and resilient packing 16 disposed about the sleeve 15. The insert 3 has therethrough a radial duct 17 which connects the annular space 14 inside the insert 3 with an annular space 18 outside the insert 3, which annular space 18 is in turn in communication with the source of testing fluid under pressure through a bore 19 in the housing 2.

The right-hand portion 20 of the insert 3 viewing FIGURE 1 forms in cooperation with the plug 8 an annular radial groove 21 in which is disposed the sealing means 22 in the form of an annulus of rubber or other resilient material as shown with opposed outwardly flaring end faces and a concave peripheral face. The housing 2 has a radial duct 23 extending from the groove 21 to a bore 24 in communication with the source of testing fluid under pressure so that the testing fluid may enter through the bore 24 and the duct 23 and press the sealing means 22 against the tube end T. The sealing means 22 is provided with a helical spring 25 which is embedded therein at the portion thereof engaging the tube for the purpose above explained.

The coaxial longitudinal portions 26 in the plug 6, 27 in the insert 3 and 28 in the plug 8 of uniform diameter constitute the tube end receiving bore of the sealing and clamping head, such bore having a diameter slightly greater than the external diameter of the tube T.

The testing fluid under pressure is admitted simultaneously to the bores 10, 24 and 19 so that the pressure inside the tube T and that exerted upon the outside of the tube by the sleeve 15 and the sealing means 22 are equal, bringing about the advantages above explained.

FIGURE 2 shows a structure which is the equivalent of that shown in FIGURE 1 but which differs therefrom in certain respects. In FIGURE 2 the sealing means 29 are disposed in a longitudinal groove 30 rather than in a radial groove as are the sealing means 22 of FIGURE 1. The sealing means 29 are maintained in place by the ring 31 having a projecting portion 32 engaging the sealing means as shown and having one or more ports 43 therethrough. In the form of FIGURE 2, the bores 33, 34 and 35 may each be connected with the source of fluid under pressure as is the case with the bores 10, 24 and 19 of FIGURE 1 or but one of the bores may be connected with the source of fluid under pressure and the bores may be connected with each other by passages 36, 37 and 38, the bores which are not directly connected with the source of fluid under pressure having their outer ends plugged. All three of the bores may have their outer ends plugged and the outer end 39 of the passage 37 may be connected with the source of fluid under pressure. The structure of FIGURE 2 functions the same as that of FIGURE 1.

Also it will be noted that the form of FIGURE 2 differs from that of FIGURE 1 in that in the form of FIGURE 2 the bore 33 is formed directly in the housing 40 and a plug such as the plug 8 of FIGURE 1 is not used. This means that all of the parts which are inserted into the sleeve 40 must be inserted from the left hand end viewing FIGURE 2.

Referring to FIGURE 3, the packing 16 is shown as being in the form of an annulus having lip-shaped flanges 41 at its ends and having inwardly tapering end faces 42 for the purpose above mentioned.

While we have shown and described certain present preferred embodiments of the invention it is to be distinctly understood that the invention is not limited thereto but may be otherwise variously embodied within the scope of the following claims.

We claim:

1. A sealing and clamping head for an end of a tube to be pressure-tested comprising a housing having an opening for receiving an end of a tube, the housing containing sealing and clamping means disposed about such opening so as to be adapted to seal and clamp the tube, means for admitting testing fluid under pressure from a source of such fluid into the housing to enter the end of a tube therein and separate connections between the sealing and clamping means and the source of fluid under pressure for rendering the sealing and clamping means operative to seal and clamp the tube simultaneously with admission of fluid under pressure into the tube so that the sealing and clamping pressure on the outside of the tube is equal to the testing pressure inside the tube, obviating deformation of the tube in the sealing and clamping zone by unequal internal and external pressures.

2. A sealing and clamping head as claimed in claim 1 in which the sealing and clamping means are both rendered operative by radial pressure.

3. A sealing and clamping head as claimed in claim 1 in which the clamping means comprise a metallic sleeve having slots extending parallel to the axis of the sleeve from the ends of the sleeve with slots extending from the respective ends of the sleeve alternating with each other in the circumferential direction.

4. A sealing and clamping head as claimed in claim 1 in which the clamping means comprise a metallic sleeve constructed and arranged so that when radially compressed against the tube it will grip the tube, resilient packing surrounding the sleeve and means for admitting the fluid under pressure into contact with the outer periphery of the packing to press the packing against the metallic sleeve and thereby cause the metallic sleeve to grip the tube.

5. A sealing and clamping head as claimed in claim 3 having resilient packing surrounding the metallic sleeve and means for admitting the fluid under pressure into contact with the outer periphery of the packing to press the packing against the metallic sleeve and thereby cause the metallic sleeve to grip the tube.

6. A sealing and clamping head as claimed in claim 1 in which the housing has an opening at one end for receiving the end of the tube and an opening at the opposite end for receiving the fluid under pressure.

7. A sealing and clamping head as claimed in claim 4 in which the housing has an opening at one end for receieving the end of the tube and the metallic sleeve and the packing are introduced into the housing through said opening, the housing having a closure member surrounding the tube which maintains the metallic sleeve and packing in place in the housing.

8. A sealing and clamping head as claimed in claim 4 in which the resilient packing is in the form of an annulus having lip-shaped flanges at its ends.

9. A sealing and clamping head as claimed in claim 8 in which the annulus is provided with inwardly tapering end faces.

10. A sealing and clamping head as claimed in claim 1 in which the sealing means have a helical spring embedded therein at the portion thereof engaging the tube.

References Cited

UNITED STATES PATENTS

| 2,655,182 | 10/1953 | Hayes et al. | 73—49.5 X |
| 2,707,388 | 5/1955 | Kent | 73—49.6 |

FOREIGN PATENTS

| 654,881 | 12/1962 | Canada. |
| 809,857 | 8/1951 | Germany. |

DAVID SCHONBERG, *Primary Examiner.*

LOUIS R. PRINCE, *Examiner.*

J. NOLTON, *Assistant Examiner.*